March 27, 1962 H. L. POTTER 3,027,206
BEARING RETAINER
Original Filed July 7, 1958
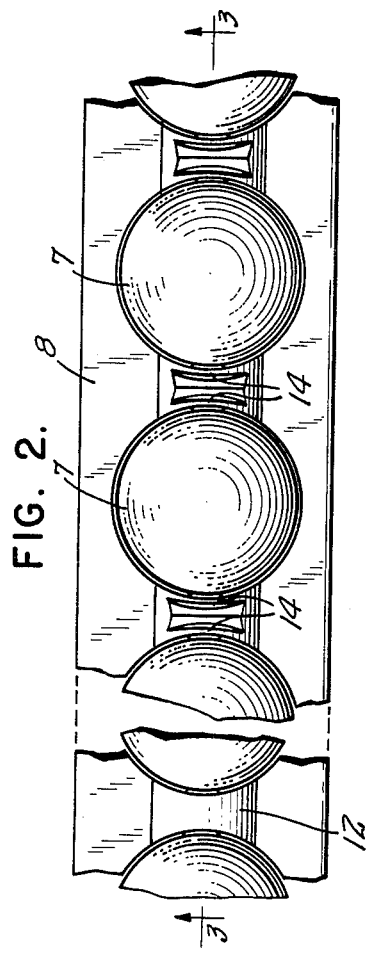
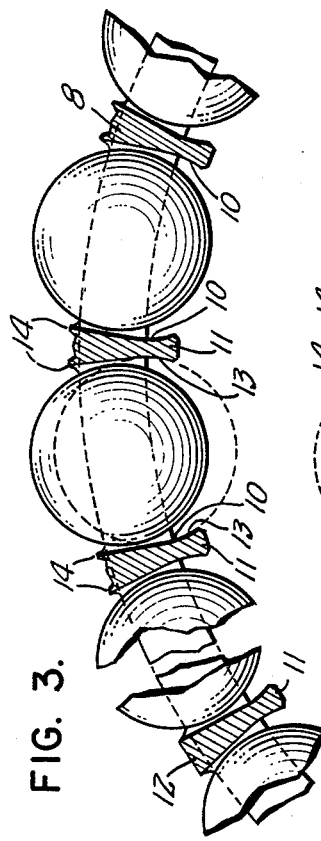
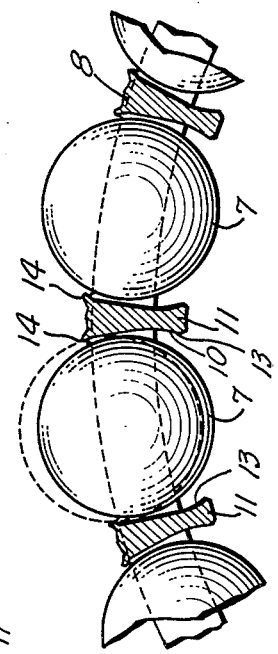
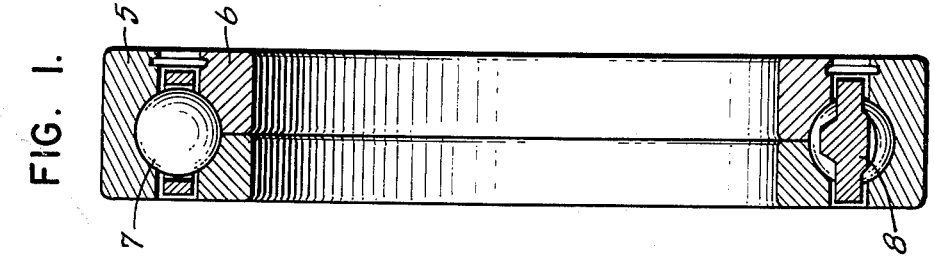
INVENTOR
HOWELL L. POTTER
BY
ATTORNEYS United States Patent Office 3,027,206
Patented Mar. 27, 1962

3,027,206
BEARING RETAINER
Howell L. Potter, New Britain, Conn., assignor to The Fafnir Bearing Company, New Britain, Conn., a corporation of Connecticut
Continuation of application Ser. No. 746,781, July 7, 1958. This application Mar. 7, 1961, Ser. No. 94,665
2 Claims. (Cl. 308—201)

My invention relates to a retainer for a ball bearing, and this is a continuation of application Serial No. 746,781, filed July 7, 1958. The retainer of the type herein referred to is cast of suitable material, such as bronze, which has bendable fingers to provide holding means for the balls.

It is an object of the invention to provide an improved form of ball retainer.

It is another object to provide a ball retainer having improved means for holding the balls in the retainer.

Still another object is to provide a retainer which may be very simply manufactured and which will hold the balls in proper seatings.

Another object is to provide an improved retainer with retainer fingers which are bendable in pairs by a tool moving either axially or radially of the retainer.

Other objects and various features of novelty and invention will be hereinafter pointed out or will become apparent to those skilled in the art.

Briefly stated, in a preferred form of the invention, I provide an annular ring retainer having a plurality of circumferentially spaced holes or pockets for the reception of balls. Between the pockets and extending generally radially inwardly are fingers provided with suitable seats for the balls in the pockets.

At the radially outer sides each hole or pocket has a pair of bendable fingers which are preferably concentric both inside and outside with each other and with the interposed ball pocket. These generally radially outwardly extending ball retaining fingers between adjacent ball pockets present facing convex surfaces which may be engaged by a tool moving either axially or radially of the retainer so as to spread these adjacent ball retaining fingers into ball retaining positions.

The ball pockets when originally formed may be slightly smaller than the diameter of the balls to be received therein. These pockets may then be reamed out with a cherry reamer so as to form generally spherical seats in the inwardly directed fingers or partitions between pockets so that the balls in the pockets rests radially inwardly in generally spherical seats or pockets.

The outer fingers are formed of lugs in the retainer at the radially outer side of the retainer ring and between each pair of pockets. These lugs are cut by a shell or trepanning tool which forms concentric circular or cylindrical surfaces on the retainers at opposite sides of each pocket. The fingers so formed in the spaces between adjacent pockets thus have generally convex facing surfaces. The inner surfaces of these retaining fingers have generally speaking been formed cylindrically or circularly by the cherry reamer or other type of tool doing the finishing of the ball pockets. Thus, when a tool, acting either axially or radially, engages the convex surfaces of the fingers for each ball pocket, the engaged fingers will be moved over the ball pocket so as to hold the ball in place. These curved fingers which are generally concentric on both the inside and outside, when bent over tend to form somewhat spherical surfaces for engagement by the balls. Thus, all of the balls may be held in the retainer.

The invention provides a retainer having several desirable advantages. The fingers described above are bendable readily without danger of deforming the pocket openings, and additionally, a more accurately dimensioned pocket opening is obtained reducing friction and wear. It will be noted still further that less material is embodied in the ring since it must be thinner than prior rings for the oppositely extending lugs to have clearance with the bearing races during use. Therefore, a retainer ring in accordance with the invention is particularly adapted for use in high speed devices, although other uses may readily occur to one skilled in the art.

In the drawings, which show for illustrative purposes only a preferred form of the invention:

FIG. 1 is a diametral sectional view through a ball bearing, showing a retainer embodying the invention;

FIG. 2 is a fragmentary development of a radially viewed section of the retainer;

FIG. 3 is a generally axially viewed fragment of the retainer shown in FIG. 2;

FIG. 4 is a view similar to FIG. 3, but illustrating the radially outwardly directed fingers bent over into ball retaining positions.

In the drawings, the complete ball bearing of FIG. 1 embodies an outer ring 5, an inner ring 6 with interposed balls 7. The balls are held in a retainer 8 embodying the invention. In the particular form shown, the inner ring 6 is formed of two sections held together, as will be understood.

The retainer shown is cast of material such as bronze, and consists of an annular retainer ring 8 having circumferentially equally spaced generally radial ball pockets 10—10. Between adjacent ball pockets and extending inwardly are inwardly directed fingers 11—11 and extending outwardly in a radial direction, the retainer has integral lugs 12 between each pair of pockets. These lugs are preferably cast so as to have the surfaces adjacent the ball pockets substantially concentric with those pockets. The pockets are normally cast of a size smaller than the diameter of the balls to be ultimately received therein, and the pockets are reamed out to proper size before assembly with the balls. In the preferred form, a cherry reamer, or similar tool, is run axially into each pocket and reams a generally cylindrical shaped pocket of a size to properly receive the balls and the reaming is continued inwardly so as to form spherical surfaces 13 at the inner end. Thus, these spherical surfaces form a generally spherical seat for the ball to prevent them from dropping radially inwardly and to sustain them in proper position in the retainer.

The fingers 14—14 formed of the lugs at the radially outer side of the retainer ring are preferably formed by a shell or trepanning tool which forms the fingers 14—14 at opposite sides of each ball pocket. Since this trepanning tool cuts a circular path, the surfaces of the lugs 14—14 between adjacent ball pockets present convex surfaces facing each other. Thus, each of these radially outer retaining fingers is generally concentric on both its inner and outer surfaces with the ball pocket, such surfaces having been formed by the cherry ream forming the cylindrical part of the ball pocket and the trepanning tool forming the outer surfaces of the fingers 14.

FIGS. 2 and 3 show the balls generally centered in the retainer and in dotted lines show the balls in their radially innermost position. In FIGS. 2 and 3 also that radially outer fingers stand up so as to permit entry of the balls radially inwardly into the pockets. The radially outwardly directed fingers 14, as shown in FIGS. 2 and 3, may then be engaged by a tool passing between the adjacent fingers between adjacent ball pockets. Such a tool will engage the facing convex surfaces and bend the fingers 14 over into the ball retaining positions, as shown in FIG. 4. These fingers 14, when bent over into ball retaining positions, tend to form generally spherical seating surfaces for the balls, and thus the latter are held both radially inwardly and outwardly by such generally spherical surfaces.

It will be seen that I have provided an improved form of retainer wherein the balls are secured in their respective ball pockets and held by generally spherical surfaces. The tools for forming the various parts are all well known and simple in construction.

While the invention has been described in considerable detail and a preferred form illustrated, it is to be understood that various modifications and changes may be made within the scope of the invention, as defined in the appended claims.

I claim:

1. A retainer for a ball bearing comprising a retainer ring having a plurality of generally radial holes for receiving balls, said ring having a single generally reduced inwardly directed finger between adjacent holes and bordering said holes at the radially inner sides, each of said fingers having arcuate opposed surfaces narrowing said holes at the radially inner ends to engage and stop the balls from falling radially inwardly through the holes, said ring at the outside having generally radially extending fingers substantially in the plane of said ring and of substantially less width than said ring defining substantially opposite sides of each said holes at the outer end, said last mentioned fingers being bendable so that after the balls are inserted said last mentioned fingers are adapted to be curved on their inner opposed faces to conform in general to the surface of the balls whereby there is concentricity for the inner surfaces of both the inwardly and last-mentioned fingers and said last mentioned fingers being curved on their outer sides so as to be substantially concentric with the inner sides.

2. A retainer for a ball bearing comprising an annular retainer ring having a plurality of radial holes for receiving balls, said holes having axes in a common radial plane, said ring being integrally formed at the radially inner part thereof and at each hole with similar surfaces narrowing said holes at the radially inner ends to engage and stop the balls from falling radially inwardly through the holes, said ring at the radially outer side thereof being formed at each hole with a pair of circumferentially spaced opposed fingers extending radially outwardly and being substantially in the plane of said ring and being of substantially less width than said ring and defining substantially opposite sides of each of said holes at the outer end, each of said fingers having a radially outwardly projecting contour which is symmetrical about said radial plane, each of said fingers having an outer convex tapered surface which is concentric with its adjacent-hole axis and which converges toward said adjacent-hole axis in the radially outward direction, each of said fingers also having an inner cylindrical surface forming a smooth concentric continuation of the adjacent-hole bore, whereby the tips of the fingers for each hole are inherently formed for concentric inward deformation about the hole axis to retain a ball inserted therein.

References Cited in the file of this patent

UNITED STATES PATENTS

| | | |
|---|---|---|
| 1,963,407 | Hermann | June 19, 1934 |
| 2,327,237 | Baden | Aug. 17, 1943 |
| 2,657,106 | Lovell et al. | Oct. 27, 1953 |
| 2,765,518 | Lovell et al. | Oct. 9, 1956 |